Jan. 31, 1928.

F. FICARRA 1,657,960

AUTOMOBILE SANDING DEVICE

Filed Feb. 25, 1927     2 Sheets-Sheet 2

Inventor
Francis Ficarra

By Clarence A. O'Brien
Attorney

Patented Jan. 31, 1928.

1,657,960

UNITED STATES PATENT OFFICE.

FRANCIS FICARRA, OF BROOKLYN, NEW YORK.

AUTOMOBILE SANDING DEVICE.

Application filed February 25, 1927. Serial No. 170,947.

This invention relates to new and useful improvements in devices whereby a supply of sand may be deposited in front of the rear traction wheels, simultaneously with the application of the foot actuated brake mechanism of the vehicle so as to prevent the slipping of the wheels, especially on wet or icy roads.

An important object of the invention is to provide a sanding device of this character that is relatively simple of construction, inexpensive of manufacture and one that may be installed in automobiles of conventional design.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views.

Figure 1:
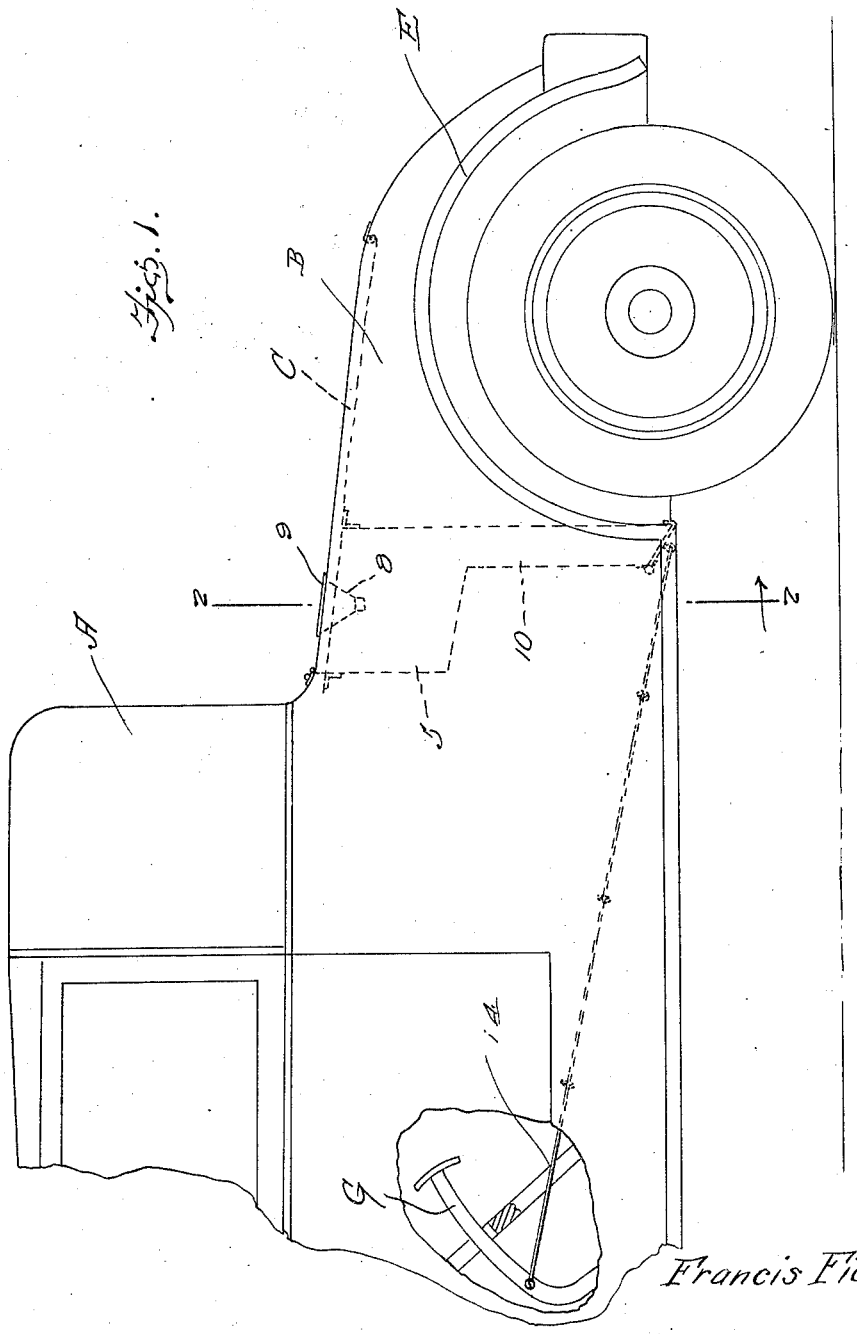
Figure 1 is a fragmentary view mainly in side elevation of a coupé type of automobile equipped with my improved sanding device.

Now having particular reference to the drawing, A designates a conventional design of automobile of the coupé type equipped with the usual rear compartment B generally designated the turtle back and having the usual hinged lid C as its top wall.

Arranged within the turtle back is a sand hopper 5 having at its top side a charging opening 6 circumferentially flanged as at 7, which flange engages through an opening in the door C of said turtle back and arranged within which is a conventional funnel 8 that may, and preferably is equipped with a lid 9.

Figure 2:
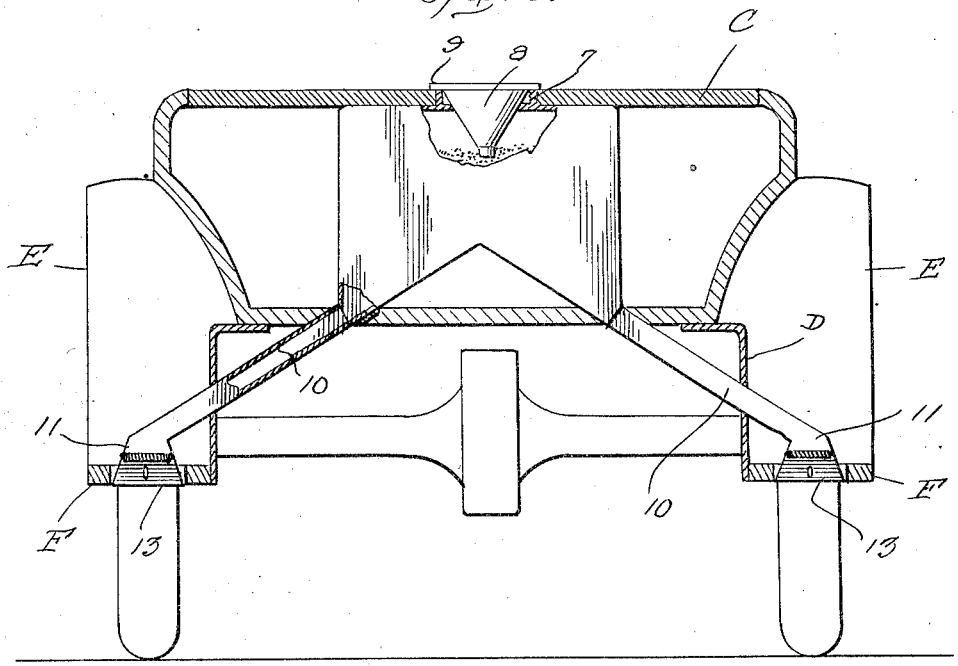
Figure 2 is a vertical section through the rear end of the automobile taken substantially upon the line 2—2 of Figure 1 for disclosing more clearly the sand hopper and the discharge pipes thereof.
Figure 3:
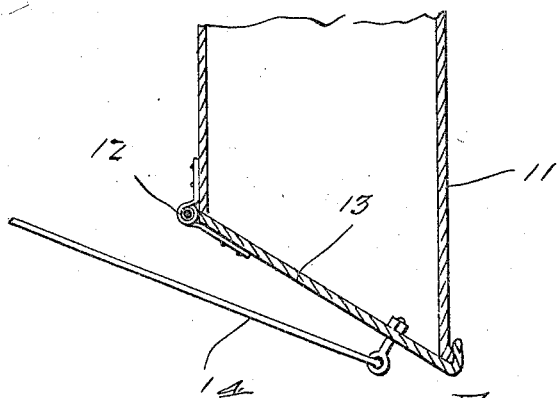
Figure 3 is an enlarged fragmentary section of the discharge end of one end of the pipe equipped with a normally closed door operable by the pressure of the foot brake pedal.

The forward portion of the bottom wall of the sand container 5 is of rearwardly sloping formation as suggested by the dotted lines in Figure 1, said bottom wall being further of inverted V-formation as in Figure 2, while leading from the opposite sides thereof at the rear end are downwardly extending diverging discharge pipes 10—10, preferably of sectional formation and extending through openings in the bottom wall of the turtle back C, as well as through openings in the fender toe boards D—D, directly at the forward ends of the rear fenders E—E. The ends of these pipes 10—10 are equipped with depending flared mouths 11—11 arranged within openings in the automobile running boards F—F. Hingedly secured to each mouth 11 by reason of a spring hinge 12 is a door 13 normally maintained closed by the action of said spring hinge as clearly indicated in Figure 3. Secured to each door 13 is the rear end of a pull rod 14 that extends forwardly beneath the car, and that is secured at its forward end to the vehicle foot brake pedal G.

Obviously, the sand within the container 5 will at all times tend to flow through the pipes 10—10. However, the escape of the sand through the pipe mouths 11—11 will be prevented by the normally closed doors 13—13.

However, when the brake pedal G is applied the pull rods will be actuated for opening these doors to permit a quantity of the sand to escape directly in front of the rear traction wheels of the automobile so that a proper stop may be made upon the road surface regardless of its condition.

Even though I have herein shown and described the invention as consisting of certain detail structural elements it is nevertheless to be understood that some changes may be made therein without affecting the spirit and scope of the appended claim.

Having thus described the invention, what I claim is:—

In a sanding device for automobiles, in combination with the running boards, the fender toe boards, and the foot brake pedal thereof; a sand hopper having a filling opening in its upper portion, the bottom of said hopper being inclined downwardly in a rearward direction and being of substantially inverted V-shaped design, a pair of sand discharge pipes diverging downwardly from the opposite sides of the hopper at the rear thereof and extending through the respective fender toe boards, flared discharge mouths at the lower ends of the pipes and extending through the respective running boards in front of the respective rear wheels of the automobile, a spring controlled closure hingedly associated with each mouth for normally maintaining the same closed, and means operatively connecting the foot brake pedal with said spring controlled closures for moving the same to an open position to allow the sand to discharge through the mouths simultaneously when the foot brake pedal is actuated.

In testimony whereof I affix my signature.

FRANCIS FICARRA.